W. E. RICKEY.
ALFALFA DRIER AND MILL.
APPLICATION FILED JULY 29, 1908.
940,193.
Patented Nov. 16, 1909.
2 SHEETS—SHEET 1.
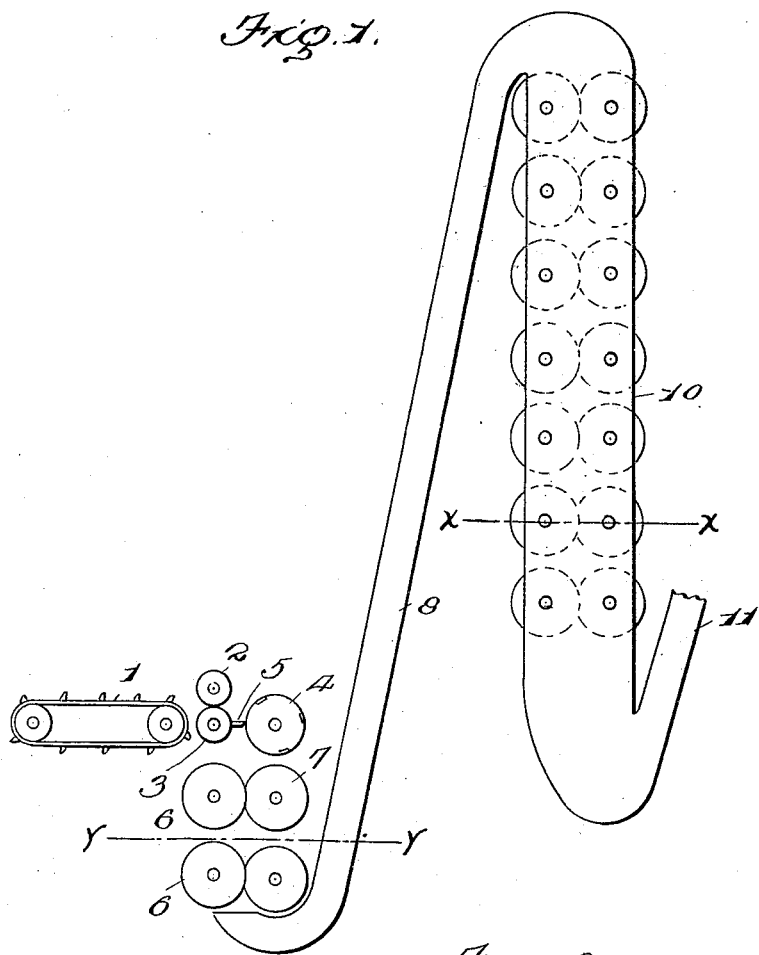
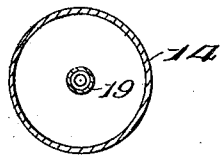
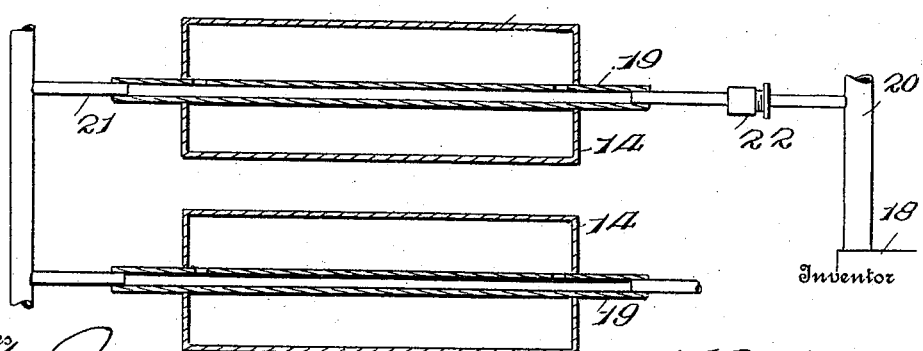
W. E. Rickey, Inventor

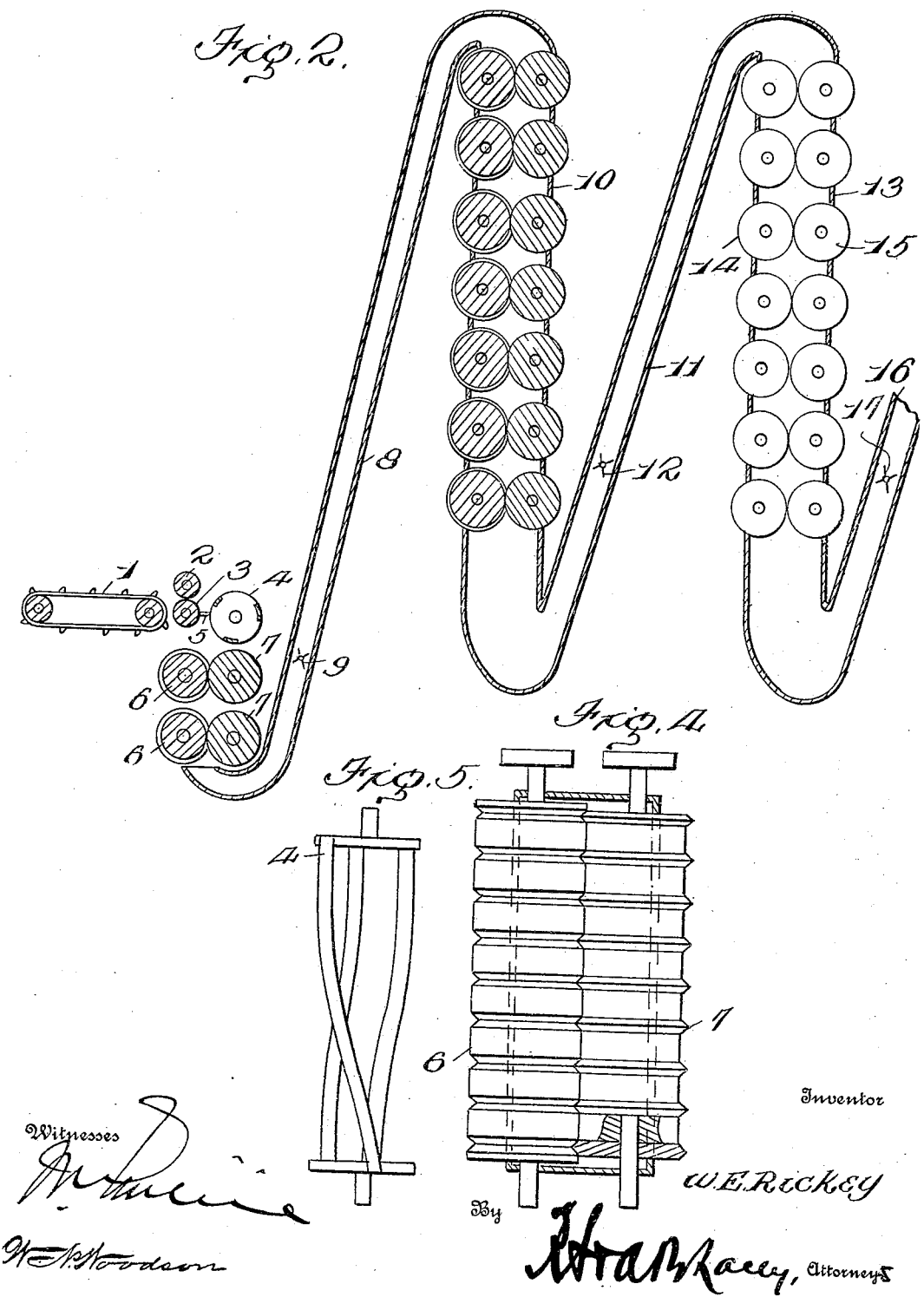

UNITED STATES PATENT OFFICE.

WILLIAM E. RICKEY, OF ROCKY, OKLAHOMA.

ALFALFA DRIER AND MILL.

940,193.           Specification of Letters Patent.      Patented Nov. 16, 1909.

Application filed July 29, 1908. Serial No. 445,996.

*To all whom it may concern:*

Be it known that I, WILLIAM E. RICKEY, a citizen of the United States, residing at Rocky, in the county of Washita and State of Oklahoma, have invented certain new and useful Improvements in Alfalfa Driers and Mills, of which the following is a specification.

This invention provides novel means for removing the moisture from alfalfa without destroying its nutritive qualities or detracting from the appearance of the product, the removal of the moisture enabling the alfalfa to be ground to provide meal or food in granular or comminuted form.

The invention is designed primarily to devise a mechanism of peculiar structure for utilizing artificial heat in effecting the drying of the alfalfa, said structure embodying means for successively pressing, cutting and heating the alfalfa to thoroughly remove the moisture and to comminute or reduce the same to the shortest lengths possible, both for food or to be subsequently ground to provide meal.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a view in elevation of a drier embodying the invention. Fig. 2 is a sectional view of a portion of the drier. Fig. 3 is a transverse section on the line $x$—$x$ of Fig. 1. Fig. 4 is a horizontal section on the line $y$—$y$ of Fig. 1. Fig. 5 is a detail view of the primary rotary cutter. Fig. 6 is a detail view of one of the pressure rolls.

Corresponding and like parts are referred to in the following description and indicated in all the views of the drawings by the same reference characters.

The apparatus comprises a feeder 1, the same consisting of an endless apron or carrier mounted upon rollers and provided with teeth to engage positively with the alfalfa or like material and advance the same to the operating mechanism. A pair of feed rolls 2 and 3 are located at the delivery end of the carrier 1 and are driven at a higher rate of speed than said carrier to prevent the latter drawing any of the alfalfa or material downward at the delivery end. A rotary cutter 4 is located opposite the pair of feed rolls 2 and 3 and comprises a series of spirally arranged blades. A stationary cutter 5 is interposed between the rotary cutter 4 and the lower feed roll 3. Pairs of cutter rolls 6 and 7 are located below the cutters 4 and 5 and act successively upon the alfalfa or material upon its descent. The rolls 6 are formed with annular grooves, whereas the rolls 7 comprise spaced cutters or disks arranged to match with and operate in grooves of the companion rolls 6. A spout 8 leads upward from the lowermost pair of cutting rolls 6 and 7 and the material is fed therethrough, this operation being effected by means of a fan blower 9 which creates a blast through said spout of sufficient force to move the material therethrough. A series of pairs of cutter rolls are located at intervals in the length of a shaft 10 with which the upper end of the spout 8 communicates. The number of pairs of cutter rolls 6 and 7 will depend upon the capacity of the appliance and the degree of fineness to which the alfalfa or like material is to be cut. A second spout 11 communicates with the lower end of the shaft 10 and a positive blast is established by means of a fan blower 12. A second shaft 13 is provided and is supplied at intervals in its length with pairs of pressure rolls 14 and 15 between which the material is passed. The spout 11 communicates with the upper portion of the shaft 13 to deliver the material thereto from the lower end of the shaft 10. The pressure rolls 14 and 15 are heated and serve to remove the moisture both by expressing the same from the material and by evaporation, the latter resulting from heating the rolls which may be accomplished in any manner. It is to be understood in this connection that there may be as many pairs of pressure rolls 14 and 15 as desired and the same may be located in one shaft or in a series of shafts, the material being fed from one shaft to another by means of a spout 16 in which a fan blower 17 is located. The medium best adapted for heating the rolls 14 and 15 is steam, the same being supplied from a generator 18 of any type. The pressure rolls are hollow and each is mounted upon a shaft 19 whose end portions are hollow, the hollow ends communicating with the interior of the rolls. One end of each roll is coupled to a supply pipe 20 and the opposite end to a return pipe 21. The shafts 19 rotate with the respective rolls and their ends make tight communication with extensions of the respective supply and return pipes. A stuffing box 22 insures the formation of a tight joint between the ends of the shafts 19 and the extensions of the respective pipes 20 and 21. The steam enters the rolls by way of the supply pipe 20 and after circulating through the rolls passes off through the return pipe 21.

In the operation of the mechanism, the alfalfa or like material to be dried and comminuted is placed upon the conveyer 1 and advanced thereby to the feed rolls 2 and 3 which in turn supply the same to the cutting mechanism 4 and 5. The material then drops and passes between the cutter rolls 6 and 7 and thence successively through the shafts 10 and 13, during which travel it is further comminuted and dried. After leaving the last set of pressure rolls, the matter may be either conveyed to a mill to be ground into meal, or stored in a bin for future use, as may be found necessary.

Having thus described the invention, what is claimed as new is:

In a mechanism of the character specified, the combination of a carrier, a pair of feed rolls adapted to receive the material from the carrier, a cutting mechanism, arranged to receive the material from the feed rolls, a series of vertical shafts, spouts connecting the lower end of one shaft with the upper end of the next shaft, and connecting the cutting mechanism with the upper end of the first shaft of the series, fan blowers in the length of said spouts, pairs of coöperating cutter rolls located in the length of one of the shafts, and pressure rolls arranged in the length of another shaft.

In testimony whereof I affix my signature in presence of two witnesses.

WILLIAM E. RICKEY. [L. S.]

Witnesses:
W. D. SANDERS,
J. W. THARP.